US005186477A

United States Patent [19]

Nakazawa et al.

[11] Patent Number: 5,186,477

[45] Date of Patent: Feb. 16, 1993

[54] DRUM CHUCKING DEVICE

[75] Inventors: Toru Nakazawa; Katsuya Kitaura, both of Osaka, Japan

[73] Assignee: Mita Industrial Co., Ltd., Osaka, Japan

[21] Appl. No.: 558,379

[22] Filed: Jul. 27, 1990

[30] Foreign Application Priority Data

Jul. 28, 1989 [JP] Japan .................................. 1-197175

[51] Int. Cl.$^5$ ............................................ B23B 31/40

[52] U.S. Cl. .................................. 279/2.09; 118/500; 269/48.1; 279/2.17; 294/93

[58] Field of Search .............. 279/2 A, 3 R, 156, 1 Q, 279/1 W, 96, 102, 2.09, 2.1-2.12, 2.17, 2.06; 242/72 R, 72.1; 118/500, 503, 428; 269/48.1, 52; 29/272; 294/93, 94; 427/435, 436

[56] References Cited

U.S. PATENT DOCUMENTS

| | | | |
|---|---|---|---|
| 1,815,611 | 7/1931 | Brown | 279/1 Q |
| 1,867,296 | 7/1932 | Woodruff | 279/1 Q |
| 2,647,701 | 8/1953 | Cannard | 279/1 Q |
| 2,869,883 | 1/1959 | Dunbar | 279/1 Q |
| 2,992,787 | 7/1961 | Craig | 242/72.1 |
| 4,086,999 | 5/1978 | McDonald | 294/93 X |
| 4,572,355 | 2/1986 | Hunter | 294/94 X |
| 4,680,246 | 7/1987 | Aoki et al. . | |
| 4,712,720 | 12/1987 | Tesch | 279/2 R X |
| 4,867,368 | 9/1989 | Tesch | 269/48.1 X |
| 4,927,205 | 5/1990 | Bowler et al. | 294/94 |

FOREIGN PATENT DOCUMENTS

| | | | |
|---|---|---|---|
| 3323306 | 12/1983 | Fed. Rep. of Germany . | |
| 1-81656 | 5/1989 | Japan . | |
| 1181700 | 2/1970 | United Kingdom | 242/72 |

*Primary Examiner*—Steven C. Bishop
*Attorney, Agent, or Firm*—Nikaido, Marmelstein, Murray & Oram

[57] ABSTRACT

Disclosed is a chucking device for chucking a drum to keep it vertical while the drum is immersed in a coating liquid to be coated with the coating liquid. The chucking device comprises upper and lower pressure members having tapered peripheral surfaces at their ends facing each other. An annular elastic member is fitted between the tapered peripheral surfaces. The pressure members are constantly urged toward each other. When chucking a drum, the lower pressure member is moved away from the upper pressure member by means of compressed air so as to contract the elastic member, thereby allowing the pressure members and the elastic member to be inserted into the drum. Then, the compressed air is released, allowing the pressure members to contact each other. This causes the elastic member to be pressed outward by the tapered peripheral surfaces to tightly contact the inner surface of the drum. Then, the drum is moved upward together with the elastic member until it abuts against a positioning portion of the upper pressure member.

1 Claim, 7 Drawing Sheets

DRUM CHUCKING DEVICE

BACKGROUND OF THE INVENTION

1. Field of the invention

The present invention relates to a chucking device used for the manufacture of, for example, electrophotographic photoconductor drums having a photoconductive layer on the outer circumferential thereof. The chucking device is used to hold a drum to keep it substantially vertical when the drum is immersed in a coating liquid containing a photoconductive substance and a volatile solvent.

2. Description of the prior art

When a conductive drum such as an aluminum drum is to be coated with a coating liquid containing a photoconductive substance for the production of an electrophotographic photoconductor, the coating liquid must be applied uniformly on the outer circumferential surface of the drum. One known process for applying a coating liquid uniformly on the outer surface of a drum is an immersion process in which the drum is first immersed in the coating liquid and then extracted therefrom in the axial direction at a prescribed speed.

In such an immersion process, the drum is kept substantially vertical when immersed into and extracted from the coating liquid. To apply the coating liquid uniformly over the entire outer circumferential surface of the drum, the drum must be held in such a manner that a chucking device and other attachments do not contact the outer circumferential surface of the drum.

Japanese Laid-Open Utility Model Publication No 1-81656 discloses a chucking device which holds a drum and keeps it substantially vertical by supporting the inner circumferential surface thereof. This chucking device includes a balloon which is inflated to tightly contact the inner circumferential surface of the drum for the purpose of holding the drum in a substantially vertical manner.

The drum is thus held by the above-mentioned chucking device while being uniformly coated with a coating liquid on the outer circumferential surface thereof. Since the balloon tightly contacts the inner circumferential surface of the drum, there is hardly any possibility of the coating liquid entering the interior of the drum from the lower opening thereof when the drum supported vertically is immersed in the coating liquid.

In the manufacture of an electrophotographic photoconductor drum, as described above, the coating liquid must be uniformly applied onto the surface of the drum to ensure the formation of a photoconductive layer of a predetermined thickness. In the aforementioned immersion process, however, the coating liquid cannot be uniformly applied to the drum if the drum is not vertically held. With the above-mentioned chucking device, it is difficult to keep the drum vertical. The drum tends to come off its vertical position when the balloon is inflated.

Furthermore, in such a chucking device, the balloon is inflated by being filled with air to hold the drum. Therefore, if the balloon holding the drum ruptures, or if the air leaks from the balloon, this will cause the drum to fall off from the chucking device. This may damage the drum and may even be dangerous.

SUMMARY OF THE INVENTION

The drum chucking device of this invention, which overcomes the above-discussed and numerous other disadvantages and deficiencies of the prior art, is a drum chucking device for chucking a drum to keep it vertical while said drum is immersed in a coating liquid to be coated with said coating liquid on its outer circumferential surface; said chucking device comprising: upper and lower pressure members which can be moved toward and away from each other, the lower end portion of said upper pressure member having a tapered peripheral surface tapering toward the lower end thereof, and the upper end portion of said lower pressure member having a tapered peripheral surface tapering toward the upper end thereof; and an annular elastic member fitted between said tapered peripheral surfaces of said pressure members; wherein said pressure members are moved away from each other to cause said elastic member to contract, thereby allowing said elastic member to be inserted into said drum, and said pressure members are moved toward each other to cause said tapered peripheral surfaces to press said elastic member outward, thereby allowing said elastic member to tightly contact the inner circumferential surface of said drum to hold said drum.

In a preferred embodiment, the elastic member is moved upward together with the drum while tightly contacting the inner circumferential surface of the In a preferred embodiment, the upper pressure member has a positioning portion which abuts against the upper end of the drum to position it when the drum is moved upward together with the elastic member.

In a preferred embodiment, the upper and lower pressure members are constantly urged toward each other.

In a preferred embodiment, the lower pressure member is moved away from said upper pressure member by means of compressed air.

In a preferred embodiment, the lower pressure member is provided with a gas ejection passage into which gas is discharged from the drum, and the upper pressure member is also provided with a gas ejection passage which communicates with the gas ejection passage of the lower pressure member.

In a preferred embodiment, the drum chucking device further comprises a cylindrical member mounted on the lower end of said lower pressure member, said cylindrical member being placed within said drum while said drum is chucked by said chucking device.

In a preferred embodiment, the outer circumferential surface of the cylindrical member slightly tapers toward the lower end thereof.

Thus, the invention described herein makes possible the objectives of (1) providing a drum chucking device which can securely hold a drum and keep it vertical; and (2) providing a chucking device which can securely hold a drum in a vertical manner and can prevent the drum from falling therefrom even if an unexpected malfunction arises.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The following describes examples of the present invention.

A drum chucking device of the present invention is used for the manufacture of an electrophotographic photoconductor drum. The photoconductor drum comprises, for example, a conductive drum such as an aluminum drum and a photoconductive layer formed on the outer circumferential surface thereof. The photoconductive layer is formed as follows: The outer circumferential surface of the drum is first coated with a coating liquid containing a photoconductive substance and a volatile solvent, and then the resultant layer of the coating liquid is dried.

For the production of the photoconductor drum, the conductive drum must be coated with the photoconductive substance uniformly on the outer circumferential surface thereof. For that purpose, before the application of the photoconductive substance, an aluminum drum used as the conductive drum to be processed into a photoconductor drum is cleaned of metal powder, grease, etc., which may adhere to the surface thereof. After the cleaning process, the aluminum drum is chucked and kept vertical by means of the chucking device of the present invention, and is then immersed in a coating liquid containing a photoconductive substance and an organic solvent, thus coating the surface of the aluminum drum with the coating liquid. Then, the thus coated aluminum drum is extracted from the coating liquid.

The drum thus coated with the coating liquid and still vertically held by the chucking device is then cleaned of the coating liquid adhering to the lower end portion thereof. The end portion of a photoconductor drum must be fitted with a flange and must be treated to be conductive, so that the coating liquid applied to the lower end portion of the drum is unnecessary and is thus removed therefrom. In this way, a photoconductor drum is produced.

Figure 3:
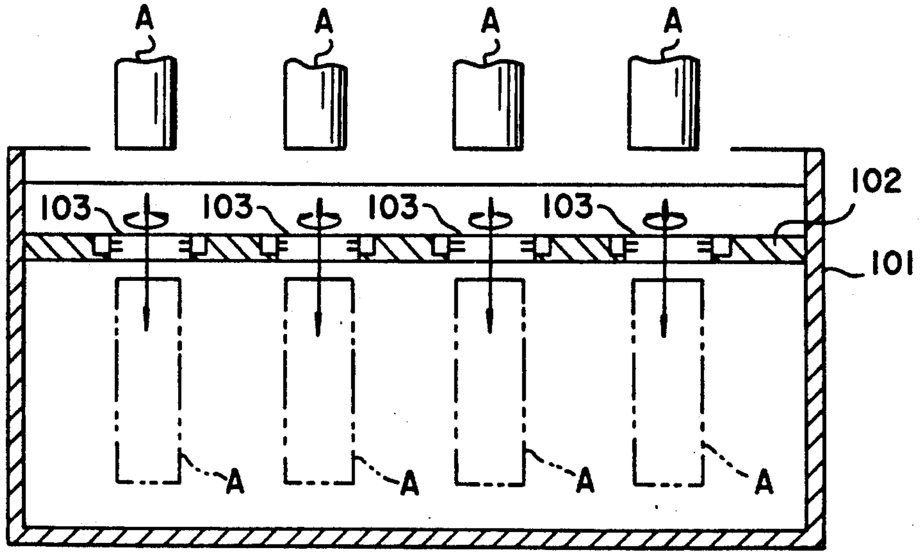
FIG. 3 is a schematic diagram showing a device for cleaning aluminum drums.

A cleaning device shown in FIG. 3 cleans aluminum drums in the manufacture of photoconductor drums. The cleaning device comprises a cleaning tank 101 containing a cleaning liquid and a plate 102 which is kept horizontal within the cleaning liquid in the cleaning tank 101. The plate 102 is provided with a plurality of holes passing therethrough, each holding a cylindrical drum-cleaning brush unit 103 having brushes on the inner circumferential surface thereof. A drum A to be cleaned is held in a substantially vertical manner and is inserted through each drum-cleaning brush unit 103 while being rotated. In this way, the outer circumferential surface of the drum A is cleaned.

Figure 4:
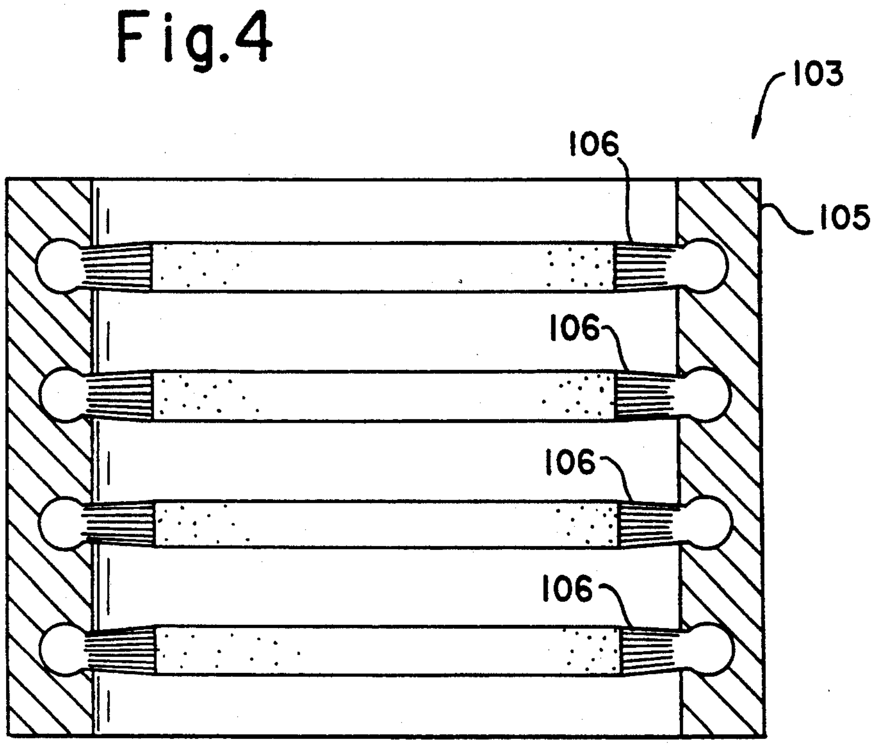
FIG. 4 is a longitudinal sectional view of a drum-cleaning brush unit used in the cleaning device of FIG. 3.
Figure 5:
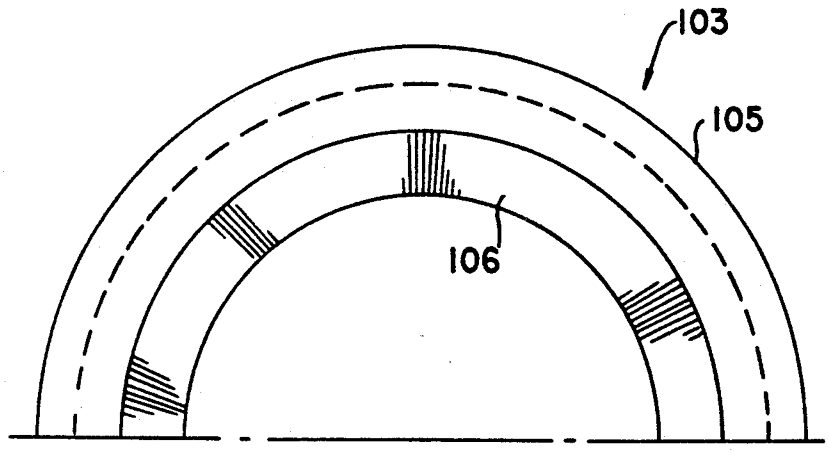
FIG. 5 is a plan view of the drum-cleaning brush unit of FIG. 4.

Each of the drum-cleaning brush units 103 comprises a cylindrical brush-holding body 105 as shown in FIGS. 4 and 5. The brush-holding body 105 holds a plurality of annular brushes 106 suitably spaced apart from each other in the vertical direction, i.e. in the axial direction thereof. The brushes 106 are disposed concentrically with one another, each comprising bristles of a predetermined length arranged in the form of a ring along the inner surface of the brush-holding body 105.

Various kinds of animal fur are used as the bristles of the brushes 106. Sheep wool is especially preferred as it has excellent solvent resistance and appropriate elasticity. When such animal fur is used, there is no possibility that the outer surface of the drum A will be scratched. Furthermore, there is little possibility that the bristles of the brushes 106 are damaged by the cleaning liquid, which ensures a long life for the brushes 106.

The drums A are, while being rotated, inserted through the respective drum-cleaning brush units 103 in the cleaning liquid, so that the brushes 106 of each brush unit 103 are sequentially brought into contact with, and rub against, the outer circumferential surface of the corresponding drum A in order to clean it.

During the cleaning process, metal powder, dust, and other foreign substances are removed from the drum A, and are passed through the gaps between adjacent brushes 106 and dispersed into the cleaning liquid so as to be suspended therein. This prevents the metal powder, dust, and other foreign substances from being deposited on, or caught between, the bristles of the brushes 106, thus eliminating the possibility of dust and other foreign substances being redeposited on another drum A which will be inserted through the brushes 106 in the subsequent cleaning process.

Figure 6:
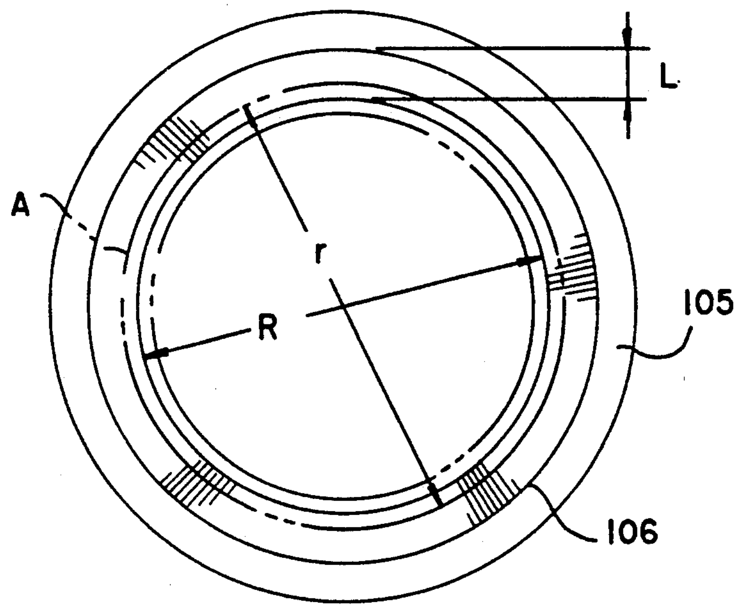
FIG. 6 is a plan view showing the operation of the drum-cleaning brush unit of FIG. 4.

In the case where the brushes 106 are formed in a perfectly circular shape as shown in FIG. 6, a good cleaning effect can be obtained and foreign substances can surely be prevented from being redeposited on the drum A, by setting the relationship between the inside diameter R of each brush 106 and the outside diameter r of the drum A as follows:

$$r-5<R<r-2 \text{ (Unit:mm)}$$

and by setting the effective length L of the bristles as follows:

$$7<L<10 \text{ (Unit:mm)}$$

In the above formula, the effective length L of the bristles is the length along which each bristle of the brushes 106 bends due to its elasticity while rubbing against the outer circumferential surface of the drum A. Actually, it is the length of the bristles of the brushes 106 projecting from the inner circumferential surface of the brush-holding body 105.

Figure 7:
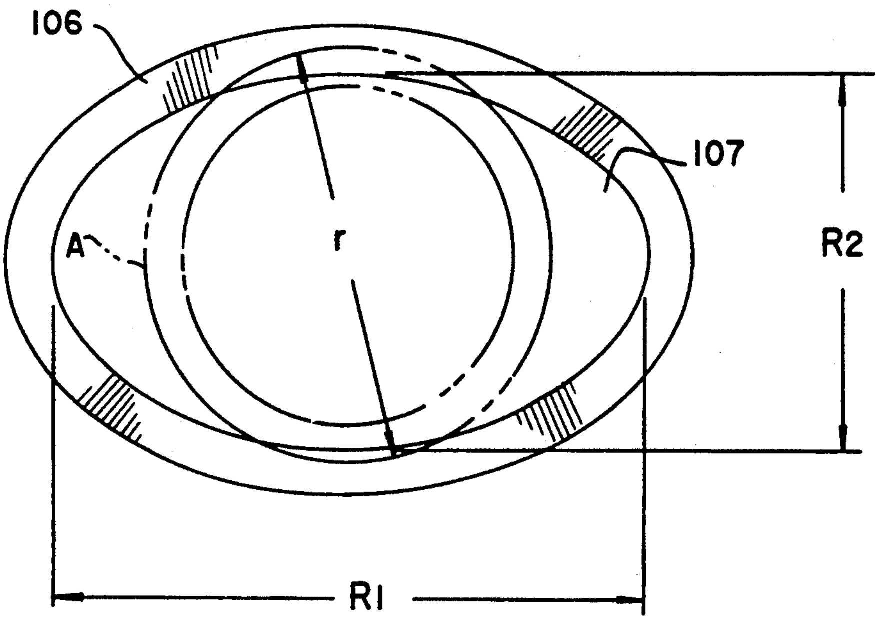
FIG. 7 is a plan view showing the operation of another drum-cleaning brush unit.

The brush 106 need not be formed in a perfectly circular shape, but may be formed, for example, in an elliptic shape as shown in FIG. 7. In this case, when the drum A is inserted through the brush 106, two opposite portions of the brush 106 contact the outer circumferential surface of the drum A while the other portions thereof do not contact it, as shown by the phantom lines in FIG. 7. Therefore, metal powder, dust, and other foreign substances removed from the drum A are dispersed into the cleaning liquid through gaps 107 between the drum A and the portions of the brush 106 which do not contact the surface of the drum A, and the thus dispersed substances are suspended in the cleaning liquid. When a drum A having such an outside diameter as to close the gaps 107 is inserted through the brush 106, two opposite portions of the brush 106 tightly contact the drum A while other portions thereof lightly contact it. In this case, the foreign substances removed from the drum A are dispersed into the cleaning liquid through the portions of the brush 106 that lightly contact the drum A.

When the brush 106 is formed in an elliptic shape, an excellent cleaning effect can be obtained and the foreign substances dispersed into the cleaning liquid is prevented from being redeposited on the drum A, by setting the major axis R1 of the brush 106, the minor axis R2 thereof, and the outside diameter of the drum A as follows:

$r < R1 < r+3$ (Unit:mm)

$r-5 < R2 < r-2$ (Unit:mm)

The cleaning liquid contained in the cleaning tank 101 is preferably a solvent having a KB value of 120 to 140 for cleaning the aluminum drum A. The solvents having KB values of 120 to 140 which are used as the cleaning liquid include, for example, dichloromethane (KB value: 136, Trademark: Methachlene), trichloroethylene (KB value: 130), 1,1,1-trichloroethane (KB value: 124), methylene chloride (KB value: 135), etc.

The KB value (Kauri-Butanol Value) is a value used in the lacquer and paint industry to indicate the dissolving power of a diluent. The value is represented by the quantity of the diluent (measured in cc) necessary to separate kauri gum from 20 g of a standard kauri gum-butanol solution (American Gum Importers Laboratories' Inc.) at 25° C. The higher the value is, the greater the dissolving power thereof.

Such solvents may be used singly, or two or more of them may be used together. Also, other aromatic solvents, alcohol solvents, ketone solvents, ether solvents, hydrocarbon solvents, etc., may be added in small quantities.

When the aluminum drum A is treated with such solvents having a KB value of 120 to 140, oily deposits on the aluminum drum A can be effectively removed, and no environmental pollutions will be caused. In particular, the above-mentioned chlorine solvents can be used with safety to clean the drums since these solvents are nonflammable and do not have any possibility of causing an explosion. Furthermore, since the above-mentioned solvents do not soften or dissolve the brushes made of animal fur or deteriorate the elasticity or other properties thereof, the brushes can be used with their initial properties retained for a long period of time for cleaning the aluminum drum A.

The thus cleaned aluminum drum A is chucked by the drum chucking device of the present invention for a coating process in which a prescribed photoconductive substance is applied to the outer circumferential surface of the drum A.

Figure 1:
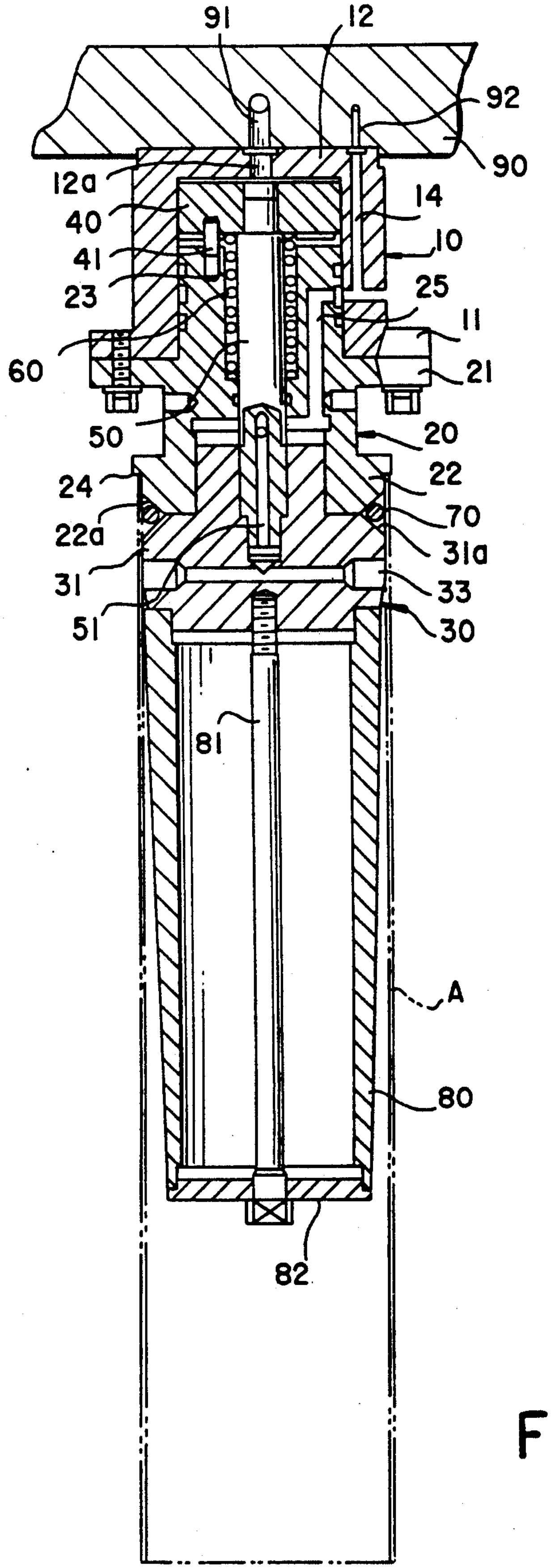
FIG. 1 is a longitudinal sectional view of a chucking device according to the invention.

As shown in FIG. 1, the drum-chucking device is mounted on a vertically movable head-support base 90, so that the entire device is moved up and down along with the head-support base 90. On the head-support base 90 are mounted, for example, a plurality of chucking devices arranged in a prescribed array. Each chucking device has the same construction and comprises a cylindrical support member 10 mounted on the head-support base 90, a cylindrical upper pressure member 20 secured to the support member 10, and a lower pressure member 30 mounted on the upper pressure member 20 in such a manner that it can be moved toward and away from the upper pressure member 20.

The cylindrical support member 10 has a closed upper end 12 and an open lower end, and is secured to the head-support base 90. A flange portion 11 is formed on the lower end of the support member 10, while the upper part of the cylindrical upper pressure member 20 is fitted into the lower interior portion of the support member 10. A flange portion 21 is formed around the middle portion of the upper pressure member 20, the flange portion 21 and the flange portion 11 abutting against each other to be secured together with bolts. The lower part of the upper pressure member 20 extends downward from the support member 10, and is provided at its lower end with a base 22 having an increased diameter. The lower portion of the base 22 is fitted into the upper end portion of a drum A to be coated with a coating liquid.

The upper part of the base 22 is provided with a positioning portion 24 projecting outward in the form of a flange encircling the entire circumference of the base 22. The positioning portion 24 abuts against the upper end face of the drum A to be chucked, thereby positioning the drum A.

A piston member 40, which is slightly movable in the vertical direction, is fitted in the upper inner space of the support member 10 and located above the upper pressure member 20. The piston member 40 is provided with a vertical guide pin 41 projecting downward therefrom. The downwardly projecting portion of the guide pin 41 is inserted into a guide hole 23 vertically formed in the upper part of the upper pressure member 20. The guide pin 41 can vertically slide along the guide hole 23. Accordingly, when the piston member 40 is moved up and down in the support member 10, the guide pin 41 is slid along the guide hole 23 to guide the piston member 40.

The upper end of a rod 50 is fitted into the piston member 40 along the axis thereof. The rod 50 is inserted through the axis of the upper pressure member 20, the lower end of the rod 50 being fitted into the lower pressure member 30. The upper part of the rod 50 passes through the upper interior part of the upper pressure member 20 with a slight clearance provided therebetween, while a compression spring 60 is fitted onto the rod 50 to be positioned in that clearance. The compression spring 60 constantly urges the piston member 40 upward, so that the rod 50 fitted in the piston member 40 is constantly urged upward. Thus, the lower pressure member 30 in which the lower end of the rod 50 is fitted is constantly urged upward.

In the upper end of the support member 10 is formed an air inlet 12*a* through which compressed air is supplied onto the upper end of the piston member 40. The compressed air supplied into the support member 10 through the air inlet 12*a* pushes down the piston member 40 against the urging force of the compression spring 60. The air inlet 12*a* communicates with an air passage 91 formed in the head-support base 90, so that compressed air is supplied into the air inlet 12*a* through the air passage 91.

The upper part of the lower pressure member 30 is slidably fitted into the lower part of the upper pressure member 20, and the other part of the lower pressure member 30 projects downward from the upper pressure member 20. The part of the lower pressure member 30 projecting downward from the upper pressure member 20 serves as a pressure portion 31 having an increased diameter. The pressure portion 31 of the lower pressure member 30 is generally formed in a truncated cone having a diameter slightly decreasing toward the lower end thereof.

The periphery of the lower end of the base 22 of the upper pressure member 20 forms a tapered surface 22*a* gradually decreasing in diameter toward the lower end thereof. Also, the periphery of the upper end of the pressure portion 31 of the lower pressure member 30, which faces the lower end of the base 22, forms a tapered surface 31*a* gradually decreasing in diameter toward the upper end thereof. This means that the tapered surfaces 22*a* and 31*a* facing each other are sloped in opposite directions from each other. Therefore, when the lower end of the base 22 abuts against the upper end of the pressure portion 31, the tapered surfaces 22*a* and 31*a* form a groove having a V-shaped cross section around the entire circumference thereof between the base 22 and the pressure portion 31.

Figure 2:
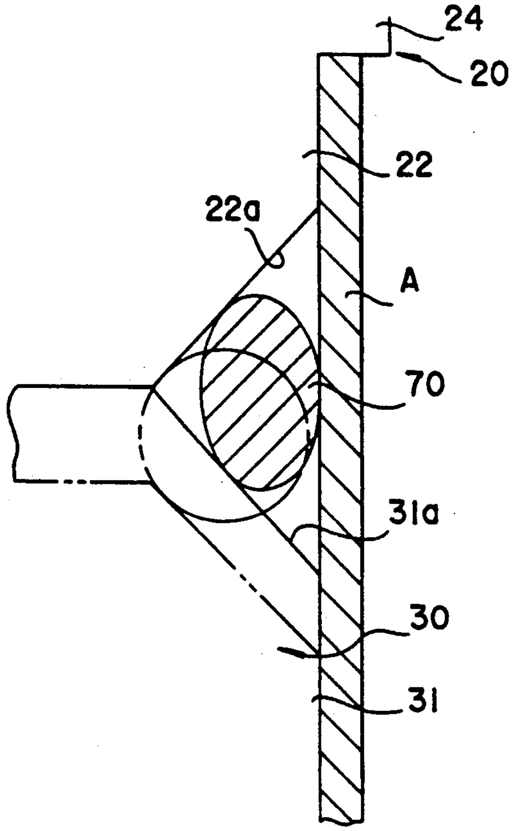
FIG. 2 is an enlarged view of the main part of the chucking device of FIG. 1.

Between the tapered surface 22*a* and the tapered surface 31*a* is fitted an annular elastic member 70 having a circular cross section. The elastic member 70 is made of fluororubber or the like having superior solvent resistance. When the lower pressure member 30 is in a lowered position with the pressure portion 31 separated from the base 22 of the upper pressure member 20, the elastic member 70 contracts by its own elasticity to fit into the space created between the base 22 and the pressure portion 31 as shown by the two-dot dash line in FIG. 2. In this situation, the outside diameter of the elastic member 70 is slightly smaller than the inside diameter of the drum A to be chucked. When the pressure portion 31 is moved upward, the elastic member 70 is pressed by the tapered surface 31*a* and is moved upward along the tapered surface 22*a* of the base 22 while expanding outward as shown by the solid line in FIG. 2. This allows the elastic member 70 to tightly contact the inner surface of the drum A to firmly hold the drum A. The elastic member 70 is further moved upward by the tapered surface 31*a* together with the drum A held thereon until the pressure portion 31 comes into contact with the base 22.

A vapor ejection passage 33 extends horizontally through the middle part of the pressure portion 31 of the lower pressure member 30. The respective ends of the horizontal vapor ejection passage 33 open outward through the outer circumferential surface of the pressure portion 31, thus communicating with the interior space of the drum A vertically supported by the elastic member 70. The middle part of the vapor ejection passage 33 communicates with a vapor ejection passage 51 passing through the lower center of the rod 50 fitted in the lower pressure member 30. The vapor ejection passage 51 further communicates with a vapor ejection passage 25 formed in the upper pressure member 20. Furthermore, the vapor ejection passage 25 communicates with a vapor ejection passage 14 formed in the support member 10, the vapor ejection passage 14 in turn communicating with a vapor ejection passage 92 formed in the head-support base 90. A solenoid valve (not shown) is disposed in the vapor ejection passage 92.

The upper end of a cylindrical member 80 is fitted on the lower end of the pressure portion 31 of the lower pressure member 30. The cylindrical member 80 has a diameter slightly decreasing toward the lower end thereof. The lower end of the cylindrical member 80 is closed with a lid 82. A mounting shaft 81 passes through the axis of the cylindrical member 80. The upper end of the mounting shaft 81 is fitted into the lower pressure member 30, while the lower end of the mounting shaft 81 is fitted into the lid 82. The cylindrical member 80 is disposed with a suitable space between its outer surface and the inner surface of the drum A. The volume of the interior space of the drum A is reduced due to the cylindrical member 80 disposed therein.

A plurality of chucking devices of the above construction, for example, eight of them are arranged in four rows of two lines and supported on the head-support base 90 in such a manner that they are moved up and down all at the same time. The head-support base go operates for its vertical movement while located above a drum transport line along which the drums A to be coated with a coating liquid are transported. Along the drum transport line is transported a pallet on which the drums A can be vertically held in such an array as to match the array of the chucking devices supported on the head-support base 90.

The following describes the operation of the chucking device of the present invention. When the drums A carried on the pallet along the drum transport line reaches a specified position, the head-support base 90 is lowered to move all the chucking devices down, thus inserting the cylindrical member 80 of each chucking device into the corresponding drum A. At this time, compressed air is supplied through the air inlet 12*a* into the upper interior part of the support member 10, so as to keep the piston member 40 in a lowered position, thereby maintaining the lower pressure member 30 in a lowered position separated from the upper pressure member 20. Therefore, the elastic member 70 fitted between the tapered surfaces 22*a* and 31*a* of the upper and lower pressure members 20 and 30 is in a contracted state as shown by the two-dot dash line in FIG. 2 to be positioned in the space between the pressure members 20 and 30, the outer circumference of the elastic member 70 staying inside the outermost periphery of the tapered surfaces 22*a* and 31*a*.

In this situation, each chucking device is lowered, so that the cylindrical member 80 and the lower pressure member 30 are inserted into the drum A and the elastic member 70 is placed inside the drum A without contacting the interior surface thereof. The chucking device is further lowered until the upper pressure member 20 is inserted into the drum A with its upper part left outside the drum A, and then the head-support base 90 stops lowering. At this time, the upper end of the drum A is positioned slightly lower than the positioning portion 24 provided on the upper part of the upper pressure member 20.

Then, the air inlet 12*a* is opened to allow the compressed air to be discharged therethrough from the inside of the support member 10. This causes the piston member 40 to move upward by the urging force of the compression spring 60, thereby allowing the lower pressure member 30 to move upward and closer to the upper pressure member 20 as shown by the solid line in FIG. 2. As the lower pressure member 30 moves upward, the elastic member 70 positioned between the upper and lower pressure members 20 and 30 is pushed upward by the tapered surface 31*a* of the lower pressure member 30. As the annular elastic member 70, which is formed in a circular ring, is pushed upward by the tapered surface 31*a*, it is also pressed outward and expanded in diameter, thus causing the outer circumference thereof to be pressed firmly against the inner surface of the drum A. Accordingly, the elastic member 70 tightly contacts the inner circumferential surface of the drum A in order to support it. While firmly holding the drum A, the elastic member 70 is further moved upward and outward by the tapered surface 31*a* of the lower pressure member 30 until the pressure portion 31 comes into contact with the base 22. This causes the drum A to move upward, allowing its upper end to abut against the positioning portion 24 of the upper pressure member 20. Thus, the drum A is held in a prescribed vertical position by the elastic member 70. Furthermore, since the elastic member 70 tightly contacts the drum A and the tapered surfaces 22*a* and 31*a*, the drum A is sealed by the elastic member 70, thereby attaining an airtight condition over a predetermined portion of the drum A.

When the drum A is thus being held by the elastic member 70, the drum A is in an airtight condition except for the lower end thereof. The volume of the cylindrical member 80 positioned inside the drum A is so determined as to reduce the volume of the inside space of the drum A to a predetermined level.

While the drum A is being supported by the drum chucking device with the interior of the drum A kept airtight, a tank containing a coating liquid which includes a photoconductive substance and a volatile solvent is moved upward to immerse the drum A in the coating liquid.

When the drum A immersed in the coating liquid is being extracted therefrom by lowering the tank, the airtight interior of the drum A becomes filled with the vapor evaporated from the volatile solvent contained in the coating liquid. When the vapor increases to cause the pressure inside the drum A to exceed a predetermined level, the solenoid valve disposed inside the vapor ejection passage 92 in the head-support base 90 is opened to provide communication between the space inside the drum A and the outside thereof through the vapor ejection passages 92, 14, 25, 51, and 33. Since the open ends of the vapor ejection passage 33 in the lower pressure member 30 are positioned below the elastic member 70 tightly contacting the inner surface of the drum A, the vapor of the solvent filled in the drum A flows through the open ends into the vapor ejection passage 33 to be discharged to the outside of the drum A through the vapor ejection passages 51, 25, 14, and 92. In this way, the vapor is discharged from the drum A without passing through the coating liquid, so as to adjust the pressure inside the drum A. This eliminates the possibility of the coating liquid entering the interior of the drum A, thus preventing the coating liquid from being applied to the inner surface of the drum A. Furthermore, there is no possibility of the vapor flowing from the inside of the drum A into the coating liquid when the drum A is being extracted. This prevents the surface of the coating liquid from being disturbed by the vapor inside the drum A and thus assures the application of the coating liquid onto the drum A with a uniform thickness.

When the vapor is to be discharged out from the drum. A through the vapor ejection passage 33, the vapor inside the drum A flows along the outer surface of the cylindrical member 80 having an outside diameter slightly decreasing toward the lower end thereof. In this way, the outer surface of the cylindrical member 80 serves as a guide surface for the vapor.

The upper and lower pressure members 20 and 30 are made of stainless steel having excellent mechanical strength and superior solvent resistance, for example, SUS 316 in particular. The cylindrical member 80 is made of aluminum having a relatively light weight and superior solvent resistance. For the elastic member 70, fluororubber or the like having superior solvent resistance is used.

As described above, in the drum chucking device of the present invention, since the annular elastic member is moved by the pressure members in the diagonally upward direction, the elastic member comes into contact with the drum and then moves the drum upward to make it abut against the prescribed positioning member. Thus, the drum is securely held in a prescribed vertical position.

Furthermore, since the pair of pressure members which press the elastic member are always urged toward each other, the elastic member is usually maintained in a position to hold the drum. Therefore, even if any trouble occurs, for example, in the mechanism for moving the pressure members, the drum remains held by the elastic member without any possibility of falling off, thus ensuring safety. Also, the pressure members have only to be subjected to the force overcoming the urging force constantly applied thereto only when chucking the drum and when releasing it, resulting in markedly improved operativity.

Figure 8:
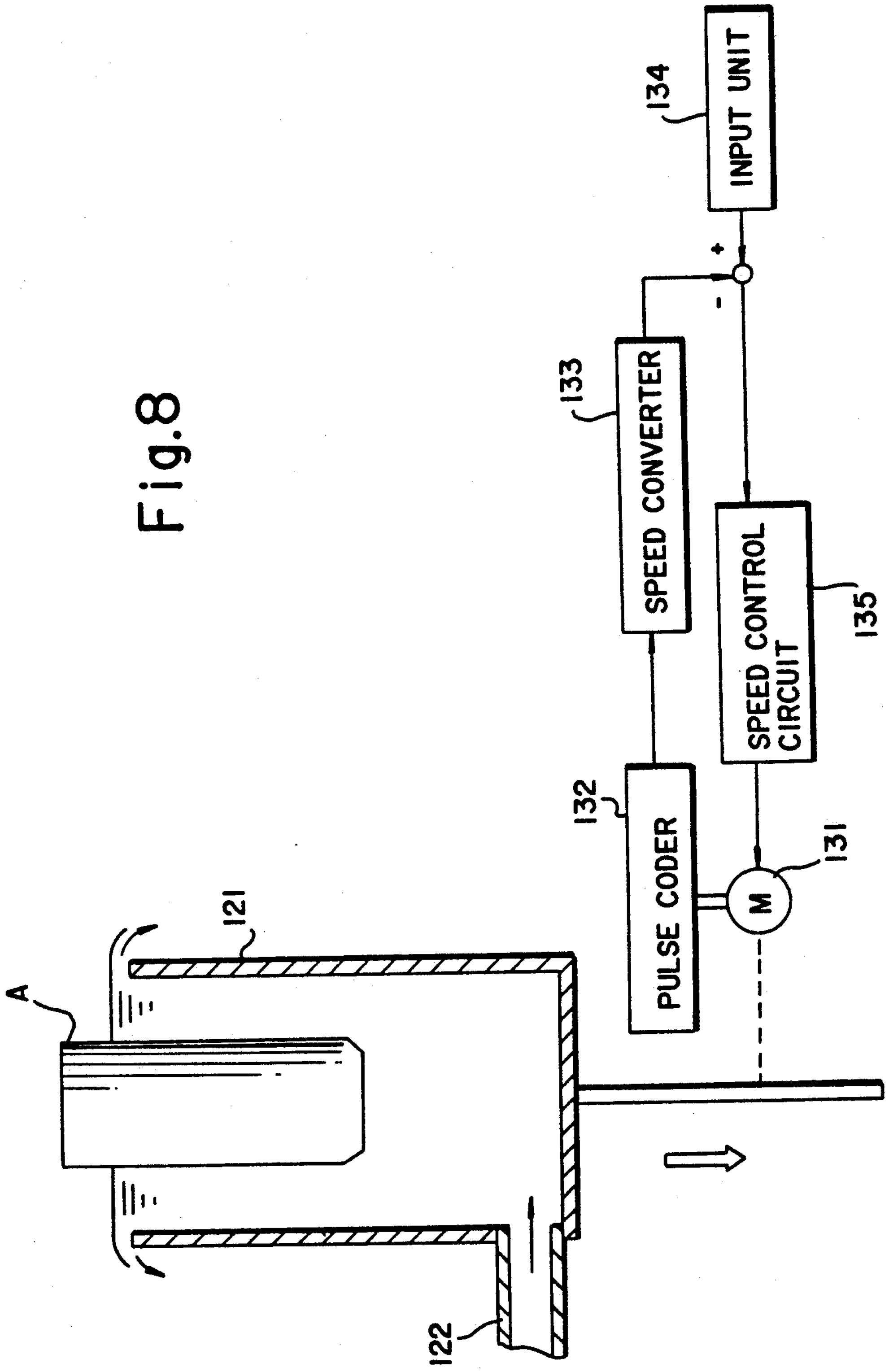
FIG. 8 is a schematic diagram of a coating device.

As shown in FIG. 8, the coating liquid to be applied to the aluminum drum A is contained in a cylindrical tank 121. The tank 121 is moved up and down with respect to the drum A chucked by the chucking device. The drum A is immersed into the coating liquid when the tank 121 is moved upward, and is extracted therefrom when the tank 121 is moved downward.

The tank 121 is provided with a coating liquid supply pipe 122 at one side of its lower part, so that the coating liquid is supplied from the supply pipe 122 and flows upward in the tank 121.

The periphery of the lower end portion of the aluminum drum A is tapered toward the lower end thereof to serve as a guide surface for the coating liquid supplied from the supply pipe 122, so that the coating liquid smoothly flows upward along the outer circumferential surface of the drum A.

The tank 121 is connected to a motor 131 which is rotatable in both forward and reverse directions to move the tank 121 up and down. A pulse coder 132 is attached to the motor 131 to detect the rotating speed thereof. The output of the pulse coder 132 is fed to a speed converter 133 which calculates the speed at which the tank 121 moves upward or downward, on the basis of the rotating speed of the motor 131. The output of the speed converter 133 is compared with a desired speed of the tank 121 which is previously input and stored in an input unit 134. Then, a signal corresponding to the difference is fed to a speed control circuit 135, which controls the rotating speed of the motor 131 on the basis of the signal. Consequently, the tank 121 is controlled to move at the speed previously set in the input unit 134.

In the input unit 134, a desired pattern of changes in the speed at which the drum A should be extracted from the coating liquid is previously input and stored. The changes in the speed are determined with respect to the elapse of time after the motor 131 begins to be driven to move the tank 121 downward.

The drum A is supported by the chucking device of the present invention in a substantially vertical manner, and is positioned above the tank 121. In this situation, the motor 131 rotates in the forward direction to lift the tank 121 until it reaches a prescribed position where approximately the entire part of the vertically supported drum A is immersed in the coating liquid contained in the tank 121. In this state, the coating liquid is additionally supplied through the supply pipe 122 into the tank 121. With the coating liquid overflowing the upper end of the tank 121, the tank 121 is moved downward so that the drum A leaves the coating liquid. At this time, the coating liquid supplied into the tank 121 flows from the lower to the upper part of the drum A along its outer circumferential surface immersed in the coating liquid, and overflows the upper end of the tank 121.

When the coating liquid flows upward in the tank 121, it flows along the guide surface on the lower end portion of the drum A and, while being guided by the guide surface, rises in such a way as to move away from the drum A. Therefore, even if, for example, the lower end face of the drum A has scratches or foreign substances deposited thereon to interfere with the coating liquid flowing from the end face along the guide surface of the drum A, no stagnation is caused in the flow of the coating liquid since the coating liquid is guided by the guide surface.

Figure 9:
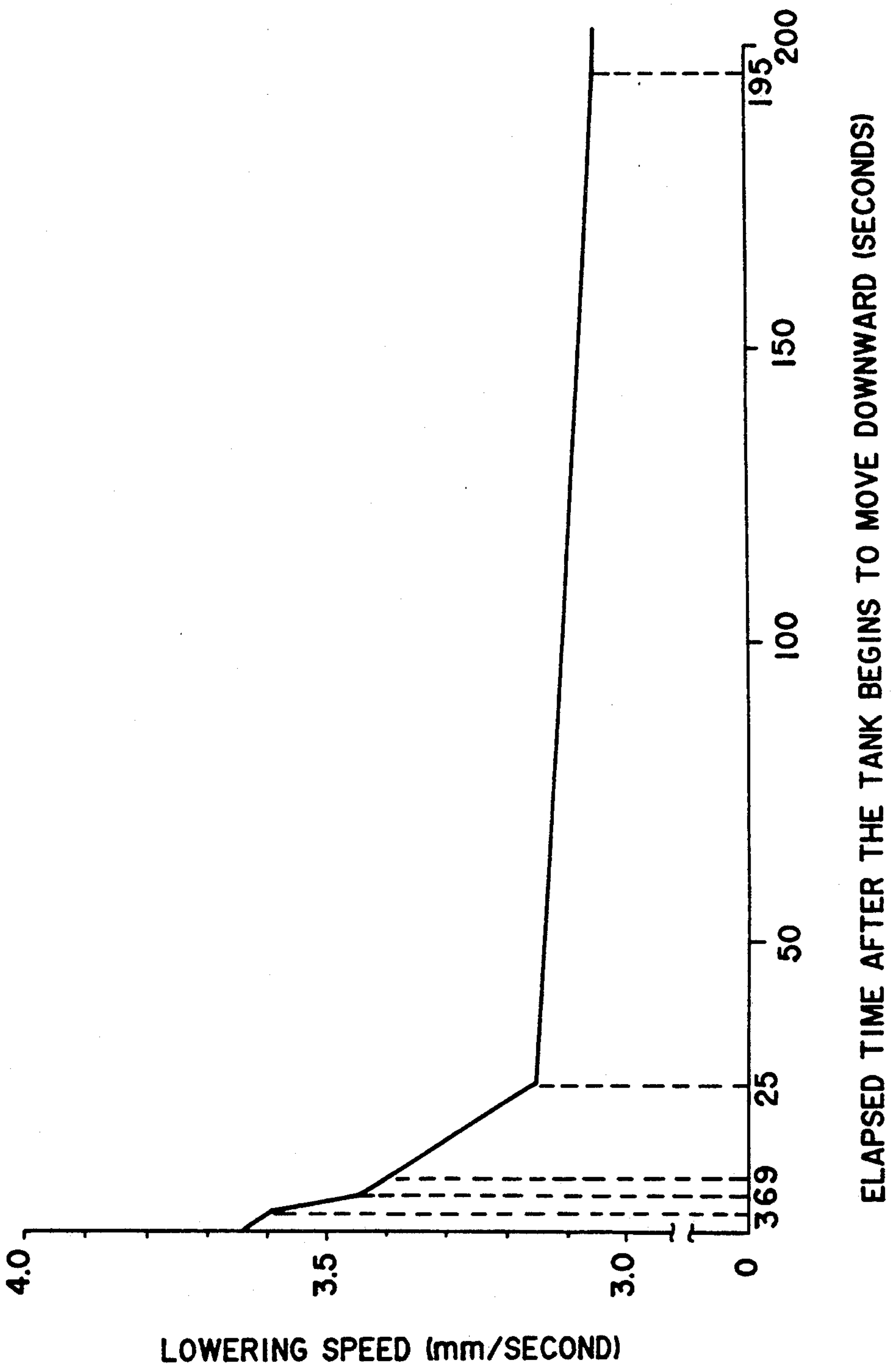
FIG. 9 is a graph showing the operation of the coating device of FIG. 8.

In the input unit 134 is stored a desired pattern of changes in the speed at which the tank 121 should be lowered with respect to the elapse of time from the start of the lowering movement. For example, in the case of a drum with a length of 344 mm, the speed at which the tank 121 is lowered (hereinafter referred to as the "lowering speed" of the tank 121) is, as shown in FIG. 9, set at 3.65 mm/second at the start of the lowering movement, and is decreased from 3.65 mm/second to 3.60 mm/second over the three seconds after the start of the lowering movement, and then from 3.60 mm/second to 3.45 mm/second over the next three-second period (6 seconds after the start of the lowering movement). The lowering speed is further decreased from 3.45 mm/second to 3.40 mm/second over another three-second period (9 seconds after the start of the lowering movement), and then, from 3.40 mm/second to 3.15 mm/second during the following 16-second period (25 seconds after the start of the lowering movement). Thereafter, the lowering speed is further decreased from 3.15 mm/second to 3.05 mm/second over 170 seconds until the drum A is completely extracted from the coating liquid (195 seconds after the start of the lowering movement).

The lowering speed of the tank 121 is detected by the speed converter 133 on the basis of the rotation speed of the motor 131 detected by the pulse coder 132 attached to the motor 131 which is being driven to lower the tank 121. The output from the speed converter 133 is constantly compared with the lowering speed previously stored in the input unit 134. The motor 131 is constantly controlled by the speed control circuit 135 so that the tank 121 is lowered at a predetermined speed stored in the input unit 134 with respect to the elapse of time after the start of the lowering movement.

As described above, with approximately the entire part of the drum A immersed in the coating liquid, and with the coating liquid flowing from the lower to the upper part of the drum A along its outer circumferential surface and overflowing the upper end of the drum A, the tank 121 is lowered in accordance with the pattern of the preset lowering speed to extract the drum A from the coating liquid in accordance with a predetermined speed pattern. Since the speed at which the drum A is extracted from the coating liquid is changed smoothly in sequence in accordance with the preset pattern of the tank-lowering speed, there is no possibility that a level difference arises on the surface of the resultant coating film when the speed is changed, and furthermore, the thickness of the film formed on the outer circumferential surface of the drum A is prevented from varying along the longitudinal direction thereof.

Figure 10:
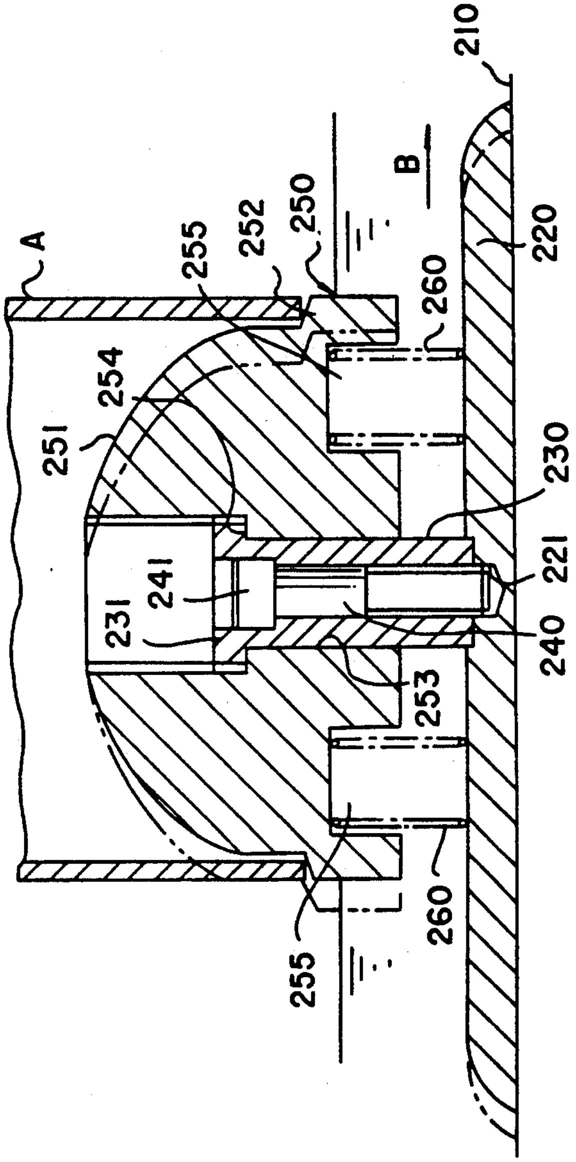
FIG. 10 is a sectional view showing a film removing device for removing the film applied to the end portion of a drum.

After the drum A is coated with the coating liquid on the outer circumferential surface thereof, the coating film formed on the end portion of the drum A is removed using a film removing device as shown in FIG. 10.

Referring to FIG. 10, the film removing device for removing the coating film from the end portion of the drum A is disposed in a treatment tank containing a solvent such as tetrahydrofuran capable of dissolving the coating film of the photoconductive substance formed on the outer circumferential surface of the drum A. A base 220 is disposed on a flat slide surface 210 which is the bottom of the treatment tank. The slide surface 210 is, for example, a mirror finished surface.

The base 220 is formed, for example, in a thin disc, and is slidably placed on the slide surface 210. The lower surface of the base 220 which contacts the slide surface 210 is provided with mirror surface finishing in the same way as in the slide surface 210, thereby reducing friction therebetween. The upper peripheral surface of the base 220 is curved in an arc shape.

A cylindrical guide member 230 is vertically mounted on the center of the base 220 using an anchor bolt 240 inserted through the axis of the guide member 230. The guide member 230 is provided with a flange 231 at the upper end thereof. The anchor bolt 240 is screwed into a threaded hole 221 in the center of the base 220. The anchor bolt 240 secures the guide member 230 to the base 220 with its head 241 pressed down against the guide member 230.

A support member 250 is supported on the guide member 230. The support member 250 comprises an upwardly projecting hemispherical head portion 251 in the upper part thereof and a drum mounting portion 252 in the lower part thereof. The drum mounting portion 252 has a larger diameter than that of the head portion 251. The head portion 251 is formed in a hemispherical shape and therefore circular when viewed from the top. A hole 253 passes vertically through the support member 250 along the axis thereof. The upper part of the hole 253 is larger in diameter than the lower part thereof, forming a step 254 between the upper and lower parts. The hole 253 is fitted on the outside of the guide member 230 in such a way that the support member 250 can slide up and down along the guide member 230. The step 254 formed inside the hole 253 is positioned lower than the flange 231 formed on the upper end of the guide member 230.

The lower surface of the support member 250 is positioned above the upper surface of the base 220, and is provided with four spring-receiving holes 255 equally spaced apart along the circumferential direction thereof. Each of the spring-receiving holes 255 is in the form of a concave shape opening downward. The upper end of a compression spring 260 is fitted into each spring-receiving hole 255. Each compression spring 260 abuts against the upper surface of the base 220 and urges the support member 250 upward, while the step 254 formed inside the hole 253 of the support member 250 abuts against the flange 231 of the guide member 230 to prevent the guide member 250 from being pulled out. In this situation, the drum mounting portion 252 formed in the lower part of the support member 250 protrudes above the surface of the solvent.

There is little clearance between the guide member 230 and the hole 253 of the support member 250, the clearance being 0.1 mm or smaller. This substantially prevents the support member 250 from tilting toward one side of the guide member 230 when the support member 250 is pushed downward against the urging force of the compression springs 260.

It is desirable that the head portion 251 of the support member 250 be made of a material which provides excellent surface smoothness, such as fluorocarbon resin or ultra high molecular weight polyethylene resin.

As previously described, the drum A having coating film on the circumferential surface thereof is held by the chucking device in a substantially vertical position above the support member 250, and then the chucking device holding the drum A is lowered with respect to the treatment tank to fit the head portion 251 of the support member 250 into the lower end portion of the drum A.

At this time, the lower end of the drum A may not be positioned to properly fit onto the head portion 251 of the support member 250 and may hit the spherical surface of the head portion 251 (the position of the head portion 251 in this situation is shown by the two-dot dash line in FIG. 10). In this case, the support member 250 is subjected to downward external force by being pushed by the lowering drum A. But since the upper surface of the support member 250 to which the force is applied is of a hemispherical shape, part of the force pushing down the support member 250 works to push the hemispherical head portion 251 of the support member 250 toward the center thereof in a substantially horizontal direction. Since the support member 250 is kept from tilting with respect to the guide member 230, the force acting on the support member 250 in the substantially horizontal direction also acts on the base 220 via the guide member 230 in the substantially horizontal direction. The base 220 is placed on the slide surface 210 provided with mirror surface finishing, with an extremely low friction therebetween. Therefore, when receiving such external force acting in the substantially horizontal direction, the base 220 is easily slid along the slide surface 210, for example, in the direction of arrow B in FIG. 10. This allows the support member 250 to move horizontally along with the base 220 from the position shown by the two-dot dash line to the position shown by the solid line until the axis of the support member 250 is aligned with the axis of the drum A. Thus, the head portion 251 of the support member 250 smoothly fits into the lower end portion of the drum A with the end face of the drum A firmly resting on the drum mounting portion 252. At this time, since the support member 250 is moved only in the horizontal direction, there is no possibility of the support member 250 flipping up, and therefore, there is no possibility of the solvent splashing.

When the head portion 251 is made of fluorocarbon resin or the like which gives superior surface smoothness, the head portion 251 can be more smoothly fitted into the lower end portion of the drum A so that the solvent is prevented from splashing.

With the support member 250 thus fitted in its lower end portion, the drum A is lowered with respect to the treatment tank to push down the support member 250 along the guide member 230 against the urging force of the compression springs 260, thereby immersing the lower end portion of the drum A into the solvent. Thereafter, the drum A is repeatedly moved up and down with its lower end face firmly contacting the drum mounting portion 252 of the support member 250. Thus, the lower end portion of the drum A is moved up and down in the solvent, so that the coating film thereon is dissolved and removed.

When the drum A is extracted from the solvent after removal of the coating film on the lower end portion thereof, the axis of the support member 250 is kept aligned with the axis of the drum A. Thus, the support member 250 moves up along with the drum A, eliminating the possibility of the solvent splashing.

As described above, since the support member 250 is smoothly moved in a horizontal direction to be fitted into the end portion of the drum A, the support member 250 does not flip up, thereby preventing the disturbance of the surface of the solvent or the splashing of the solvent. Since the upper peripheral surface of the base 220 is curved in an arc shape, the horizontal movement of the base 220 causes very little disturbance to the solvent, thus preventing the surface of the solvent from rippling.

In the case where the axis of the drum A is aligned with the axis of the support member 250 at the time when the drum A is first lowered with respect to the treatment tank, the end portion of the drum A can be fitted onto the head portion 251 without causing the horizontal movement of the support member 250.

The slide surface 210 on which the base 220 is placed is not limited to the one having a mirror surface finishing, but it may be constructed of numerous spherical bodies with a perfectly spherical surface which cover the entire bottom surface of the treatment tank.

Once the head portion 251 of the support member 250 is fitted into the lower end portion of the drum A, they are kept in contact with each other even when the drum A is repeatedly moved up and down in the solvent. Therefore, even when a plurality of drums are simultaneously moved up and down for the removal of the unnecessary coating film on the lower end portion thereof, the splashing of the solvent and the waving of the surface of the solvent can be effectively prevented. In the case of treating more than one drum simultaneously, it is desirable that individual drum immersion areas be separated from one another using partition plates, etc., to prevent the solvent in one area from interfering with the solvent in the adjacent areas.

In the above-described manner, photoconductor drums are manufactured each having coating film of a photoconductive substance on its outer circumferential surface excluding the end portion thereof.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A drum chucking device for chucking a drum to keep it vertical while said drum is immersed in a coating liquid to be coated with said coating liquid on its outer circumferential surface, said chucking device comprising:

upper and lower pressure members which can be moved toward and away from each other on a longitudinal axis, the lower end portion of said upper pressure member having a tapered peripheral surface tapering toward the lower end thereof, and the upper end portion of said lower pressure member having a tapered peripheral surface tapering toward the upper end thereof; and an annular elastic member fitted between said tapered peripheral surfaces of said pressure members;

wherein said pressure members are moved away from each other on said longitudinal axis to cause said elastic member to contract, thereby allowing said elastic member to be inserted into said drum, and said pressure members are moved toward each other to cause said tapered peripheral surfaces to press said elastic member in a direction which is radially outward with respect to said longitudinal axis, thereby allowing said elastic member to tightly contact the inner circumferential surface of said drum to hold said drum;

said further wherein said lower pressure member is provided with a gas ejection passage into which gas is discharged from said drum, and said upper pressure member is also provided with a gas ejection passage which communicates with said gas ejection passage of said lower pressure member.

* * * * *

UNITED STATES PATENT AND TRADEMARK OFFICE

CERTIFICATE OF CORRECTION

PATENT NO. : 5,186,477

DATED : February 16, 1993

INVENTOR(S) : NAKAZAWA et al.

It is certified that error appears in the above-identified patent and that said Letters Patent is hereby corrected as shown below:

Claim 1, column 16, line 16, change "said" (first occurrence) to --and--.

Signed and Sealed this

Twenty-third Day of November, 1993

Attest:

BRUCE LEHMAN

Attesting Officer

Commissioner of Patents and Trademarks